UNITED STATES PATENT OFFICE.

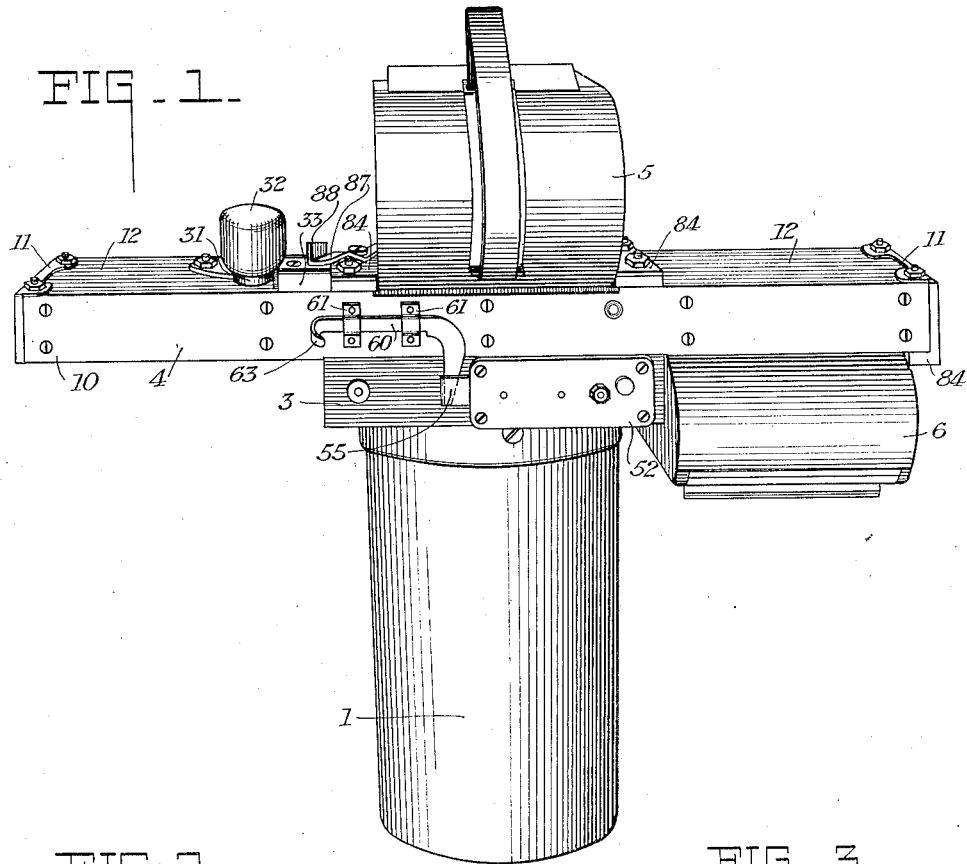

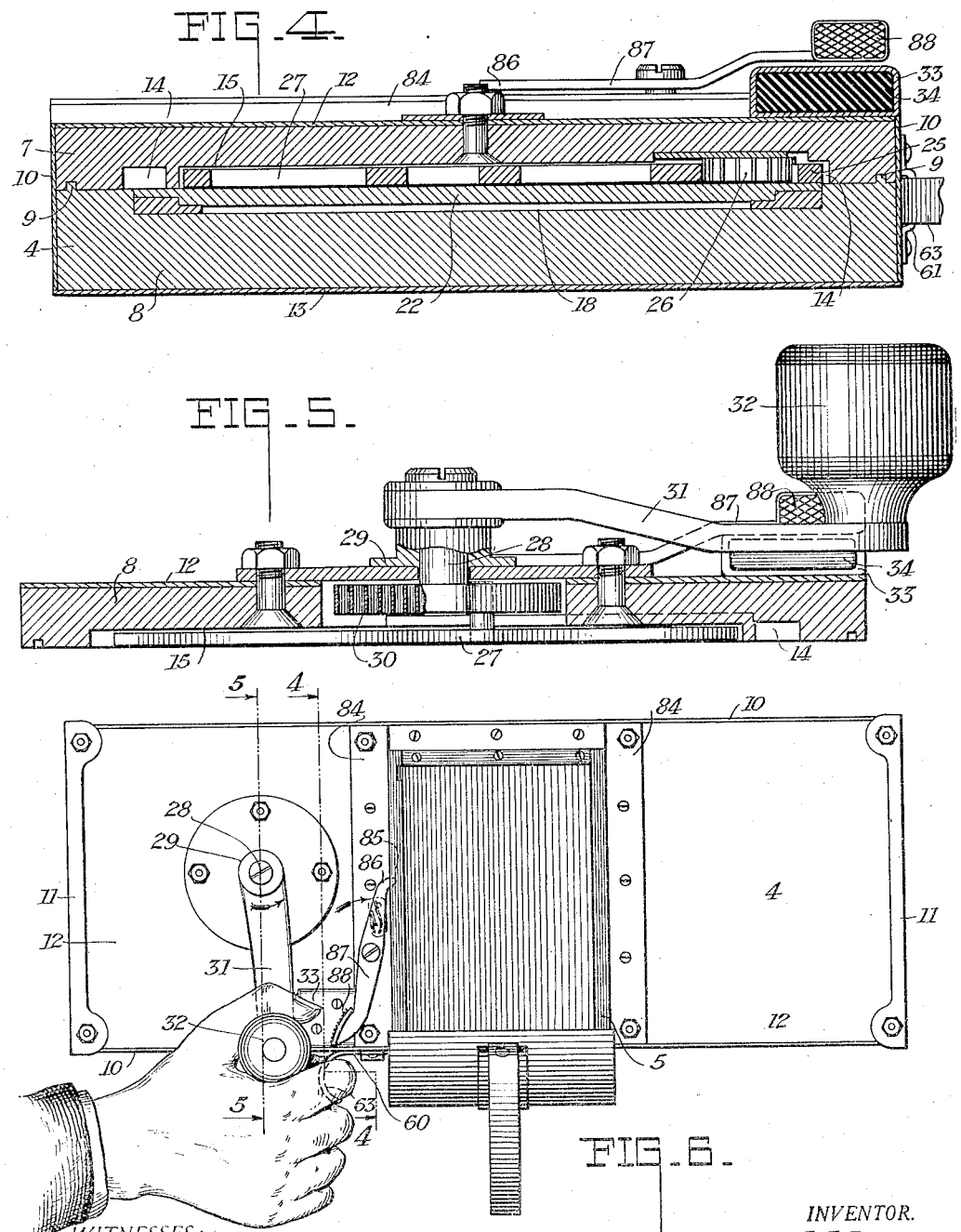

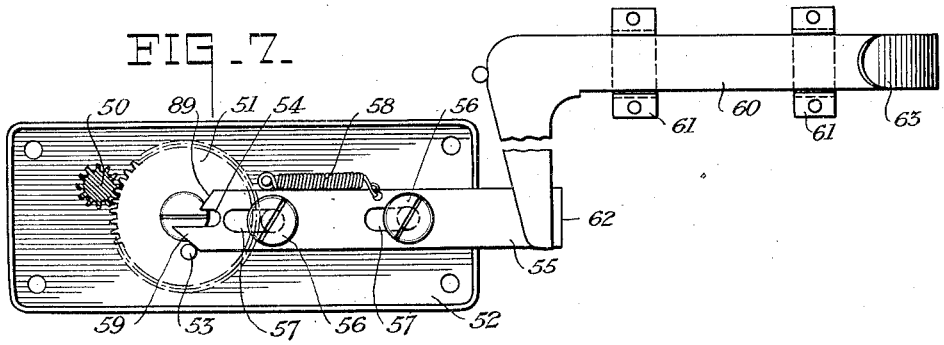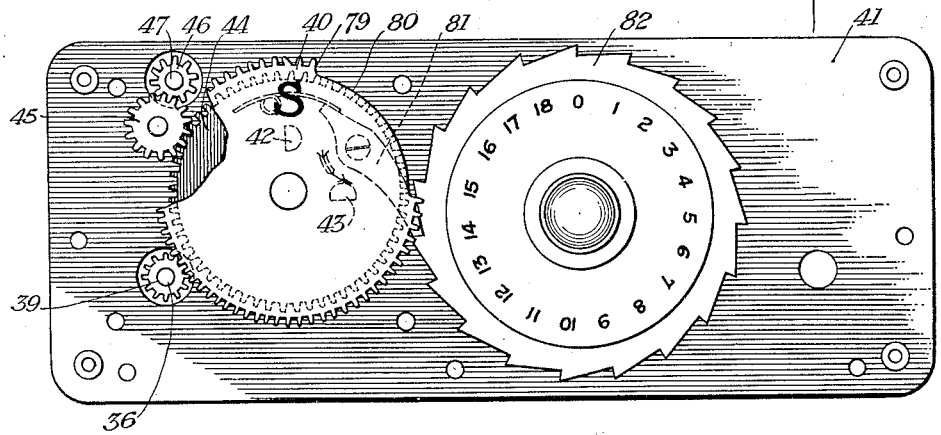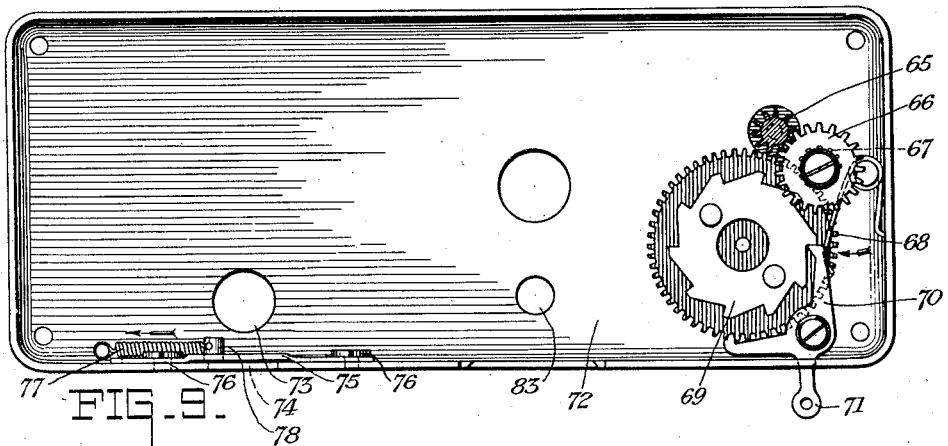

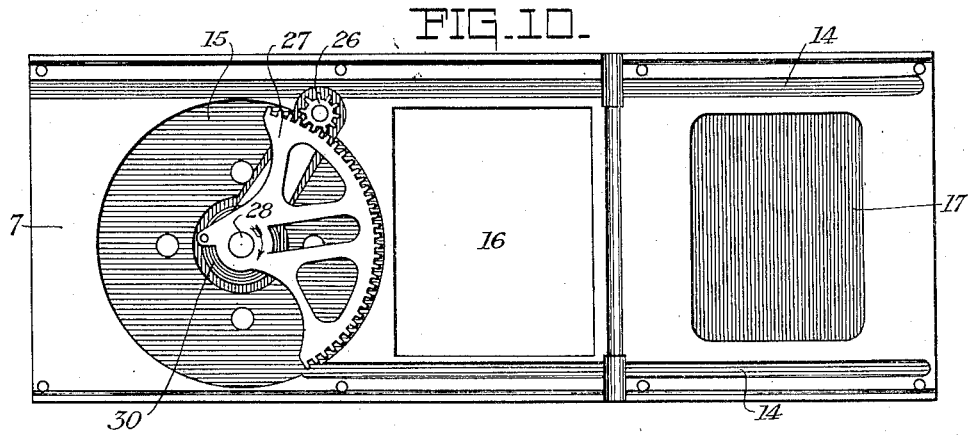
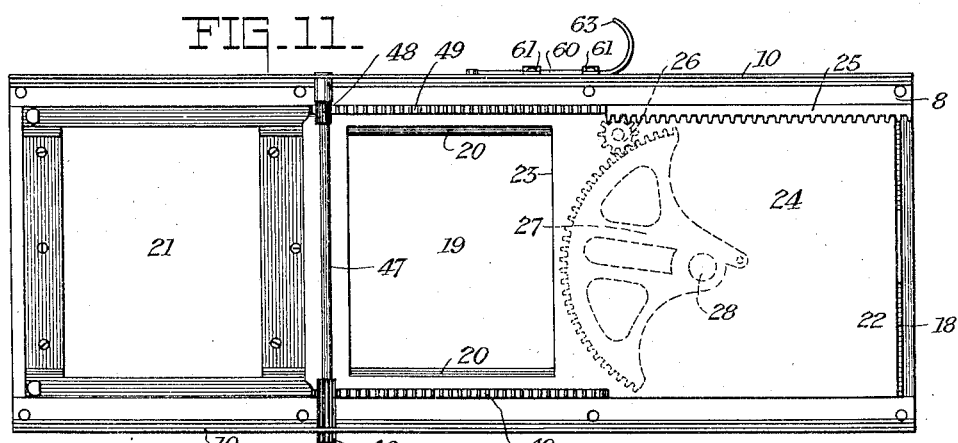
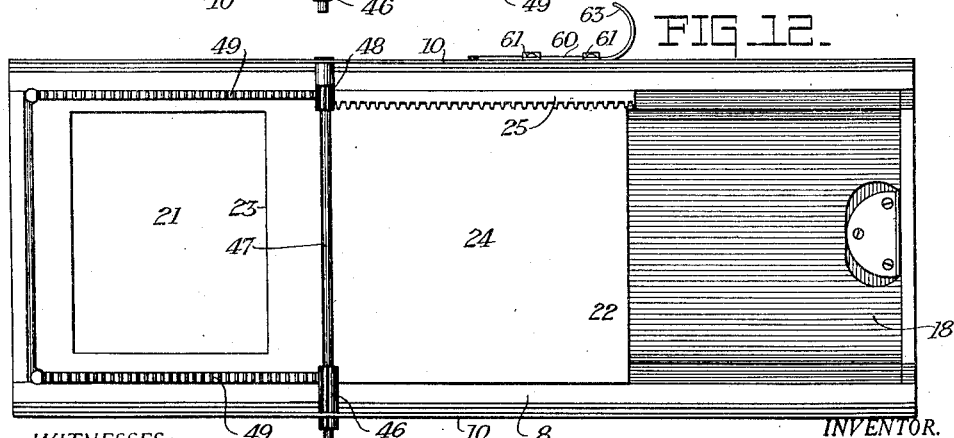

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,317,129.  Specification of Letters Patent.  Patented Sept. 23, 1919.

Application filed February 27, 1919. Serial No. 279,655.

*To all whom it may concern:*

Be it known that I, WILLIAM F. FOLMER, a citizen of the United States of America, residing at Rochester, in the county of Monroe and State of New York, have invented certain new and useful Improvements in Photographic Cameras, of which the following is a full, clear, and exact specification.

This invention relates to photographic cameras and more particularly to improvements in the operating or driving mechanism thereof. While my invention may be embodied in various kinds of cameras within the scope of the appended claims, it has been found very useful in aviators' cameras and I shall therefore describe such application of it by way of example.

One object of my invention is to provide a simple reliable driving mechanism for cameras which will promote the actuation of the different parts in their proper order; which will enable the photographer to put the camera through its entire series of movements with one hand and without removing such hand from the operating member; which will coördinate the operating member and shutter release so that the photographer can simultaneously and conveniently engage them with one hand when ready to release the shutter even if they be located on different faces of the camera; which will minimize the entrance of dust into the camera; and which will doubly impel the complete removal of the safety cover and temporary support from in front of the plates or film prior to exposure thereof. Another object of my invention is to locate the retaining catch for the removable magazine in such position that it can also be operated by the photographer without removing his hand from the main actuating member. Further objects will hereinafter appear.

In the accompanying drawings in which like numerals indicate corresponding parts throughout the several views:

Figure 1 is a perspective view of an aviation camera, illustrating one embodiment of my invention;

Fig. 2 is a top plan view of the lower part of the camera, the top being removed and the shutter being visible;

Fig. 3 is a fragmentary side elevation of the part of the camera carrying the shutter;

Fig. 4 is a transverse sectional view taken on the line 4—4 of Fig. 6;

Fig. 5 is a transverse sectional view on the line 5—5 of Fig. 6;

Fig. 6 is a top plan view of the camera with a magazine in position;

Fig. 7 is a side elevation of the release mechanism showing the parts detached from the camera for clearness;

Fig. 8 is a side elevation of the panel carrying the shutter setting gears and exposure counter;

Fig. 9 is a side elevation of the cover which fits over the panel, such cover carrying tension controlling gears for the shutter;

Fig. 10 is an inverted plan view of the top member of the camera body;

Fig. 11 is a top plan view of the lower member of the camera body;

Fig. 12 is a view of the parts shown in Fig. 11, but in different relative position.

The aviation camera which will be described by way of illustration is, in general terms, provided with a changing device for the light sensitive material. In this example plates are used which are carried in septa located in magazines of the kind shown in my prior Patent No. 1,291,820, Jan. 21, 1919. The septa, located in a horizontal position, drop vertically downward successively from the supply magazine into the exposure station or focal plane. From thence they are carried horizontally by a suitable slide above a receiving magazine into which they are dropped by gravity. The slide which moves the exposed plate over to the receiving magazine also has an opaque portion which covers up the exposure station during the plate-shifting movement. Near the end of such movement the shutter is set but no injurious light can reach the plates in the supply magazine because of the opaque or safety portion of the slide. The slide is then returned to its initial position, uncovering and positioning the next plate to be exposed. The slide and the shutter-setting mechanism are driven from a single operating member, there being a separate release for the shutter.

It is highly important that the operation of these camera parts take place in proper sequence. For instance, if the shutter release be actuated before the plate-shifting slide is returned to its proper position, such slide will wholly or partially cover the plate to be exposed and will also hold it out of the focal plane. The result will be a failure. In aerial photography, especially under war conditions, it is highly important that such failures be minimized. Accordingly, I have coördinated the parts of the camera to attain this result. Moreover the operating member and shutter release are so located that the photographer can manipulate them with one hand alone and without removing such hand from the operating lever, thus making it unnecessary for him to even look at the camera, freeing him for observation, and allowing one hand to be used for other purposes. Also I have accomplished this result in spite of the fact that the operating member is upon one face of the camera while the shutter release, due to the camera structure, is expediently placed upon a different or side face.

The operating member is moved by the hand of the photographer through a definite cycle and back to a standard position, such cycle serving to shift a new plate into position, set the shutter and remove the opaque or safety portion of the slide from beneath the exposure opening. The release is located adjacent the standard position of the operating member (which is illustrated as an oscillating crank) and consequently if the operator works with one hand and retains that hand in contact with the operating member, he can pull the release only at the proper time when the camera is ready for exposure. The operating member is provided with a spring which presses it toward its standard position and thus tends to bring the safety portion of the plate-shifting slide back to its proper position. Furthermore when the operator grasps the operating members, that is the handle of the crank, and at the same time pulls upon the release lever, he naturally contracts his hand, and so, at the same time that force is applied to the release, there is a corresponding re-active force which tends to retain the operating member in its standard position against its stop or abutment.

In practice it has been found desirable that the catch which holds the upper magazine in place be quite as accessible as the operating member and release, thereby avoiding unnecessary fumbling about when speedy work is required. Accordingly, I locate the finger piece of the magazine catch where it may also be pressed by the hand of the operator without removing such hand from the operating member.

Coming now to a detailed description of the illustrative embodiments shown in the drawings, 1 is the tubular or "cone" part of the camera carrying a lens 2 in any preferred way. At the top of the cone is located a shutter box 3 on top of which is the elongated main casing 4 of the camera. On the upper part of casing 4 and centrally in line with the cone or lens tube is detachably mounted the supply magazine 5, while near one end of the casing 4, upon its lower face, is detachably mounted receiving magazine 6. The casing 4 is conveniently made of two sections, 7 and 8, which may be fitted together by light tight joints 9 (Fig. 4) and retained in position by side plates 10 screwed thereon and end channels 11 bolted in position. For the sake of durability the upper and lower faces of sections 7 and 8 may be covered with metal plates 12 and 13.

The upper section 7 is cut away at 14 and 15 to provide working space for the movable parts. It is also provided with a central aperture 16 through which plates drop from the magazine 5 and with a socket 17 providing clearance above the magazine 6.

The lower section 8 is provided on its upper face with a cutaway portion 18 which also carries moving parts of the apparatus. It is provided centrally with aperture 19 which registers with opening 16 in section 7. At the sides of 19 are ledges 20 upon which a plate-bearing septum from magazine 5 rests during exposure, this part of the apparatus constituting the exposure station. Section 8 is also provided at one end with an opening 21, registering with the socket 17 located above the magazine 6.

The lowermost septum from the magazine 5 which rests upon ledges 20 is, after exposure, shifted along such ledges from opening 19 to opening 21 by means of a reciprocatory slide 22 provided with an opening 23 of an area to receive a septum, slide 22 being of substantially the same thickness as one septum. The rear portion 24 of the slide is opaque and covers the opening 19 when the slide approaches the septum-discharging position in Fig. 12. This rear portion 24 also supports any plates and septa which may remain in magazine 5, such septa being permitted to drop downwardly on to ledges 20 through opening 23 only when the slide 22 is completely moved back to the position shown in Fig. 11.

The slide 22 upon its upper face carries a rack 25 which travels in one of the cutaway portions 14 of upper section 7. Pivoted in cutaway portion 15 of section 7 is a small pinion 26 which meshes with the rack 25, the pinion 26 in turn meshing with a gear segment 27 also located in cutaway portion 15 and driven by a shaft 28 which extends upward through section 7 through the dust-proof bearing 29. In a socket leading into cutaway portion 15 is located a helical spring 30 which constantly tends to rotate the shaft 28 and the intermediate segment, pinion, and rack in such a direction that slide 22 is constantly pressed toward the position shown in Fig. 11.

Upon the upper end of the shaft 28 is mounted the crank 31 having on its outer end any convenient handle 32. This crank, when slide 22 is in the position shown in Fig. 11, rests against an abutment or stop 33 which may be provided with a resilient buffer 34, such as a block of rubber. This crank constitutes the operating member and is oscillated rearwardly from stop 33 until the slide 22 reaches the position in Fig. 12 and then back into engagement with abutment 33, thereby returning slide 22 to the position in Fig. 11. This cycle of the crank 31 always brings it back to stop 33 and for convenience of reference this location of the crank is referred to as the standard position.

The operation of the shutter mechanism will now be described. In the box 3 are located the transverse tension shaft 35 and winding shaft 36 over which the curtain 37 is wound back and forth to bring the slit 38 across the exposure station to make the exposure or to set the shutter, as is usual in focal plane shutters of this type. Shaft 36 carries a pinion 39 which meshes with gear 40 mounted to turn on panel 41. Upon the inner face of gear 40 is a lug 42 arranged in the path of lug 43 upon gear 44 mounted to turn upon panel 41 concentrically with gear 40 but independently of the latter except when the lugs 42 and 43 interengage. Gear 44 is connected through intermediate pinion 45 with pinion 46 on the shaft 47 mounted to turn in lower section 7. Pinion 46 and also pinion 48 at the other end of shaft 47, as shown in Fig. 11, meshes with racks 49 upon the upper face of the slide 22.

Upon the end of shaft 36, opposite to the pinion 39, is a small gear 50 meshing with a pinion 51 in the release casing 52. Upon pinion 51 is a pin 53 adapted to snap into slot 54 of slide 55 which is mounted by means of pins 56 and slots 57 to reciprocate under the influence of the spring 58 toward the center of pinion 51. Slide 55 also is provided with a shoulder 59 against which pin 53 rests when the shutter is run down, said pin engaging in slot 54 only when the shutter is set. When the slide 55 is pulled to the right in Fig. 7 or the left in Fig. 1, pin 53 is disengaged from slot 54 and the shutter is free to rotate and make an exposure, the pin coming to rest against shoulder 59. In order to actuate slide 55, I provide an L-shaped release 60, the horizontal arm of which is slidably mounted in guides 61 and the vertical arm of which engages with the bent end 62 of slide 55. The rear or free end of the release 60 is provided with a bent finger engaging portion 63.

Shaft 35 carries a spring (not shown) for turning it in a direction to wind the curtain upon it in the customary manner. This shaft is provided with a knurled head 64 at one end and a pinion 65 at the other, such pinion meshing with an intermediate gear 66 which is in turn connected through a smaller gear 67 with the tension regulating gear 68, the latter carrying upon its inner face a ratchet wheel 69 engaged by a two armed pawl or escapement 70 having an actuating projection 71. Parts 66 to 70 are mounted upon the inner face of the cupped plate 72 which covers the panel 41 and the gears contained thereon. Plate 72 has an opening 73 through which appears the letter S upon the gear 40 when the shutter is set. In order that the setting of the shutter may be indicated upon the top edge of plate 72, I provide such edge with an opening 74 through which any suitable mark may be visible, carried by the plate 75 which slides upon guides 76 under the influence of spring 77, a projection 78 upon slide 75 engaging the extremity 79 of the mutilated portion 80 of gear 40. As soon as the shutter is released, and gear 40 turns, extremity 79 moves counter clockwise in Fig. 8, thereby permitting plate 75 to move in the direction of the arrow in Fig. 9. Each time that a plate is shifted a spring pressed pawl 81, carried upon the outer face of gear 44, engages one of the teeth of ratchet wheel 82 and moves the same to bring a fresh serial number into line with the opening 83 of cover 72. Suitable tension numbers upon the outer face of gear 68 appear through an opening (not shown) in the cover 72 in the customary way.

Magazines 5 and 6 slide into engagement with suitable retaining guides 84 (Figs. 1 and 6). Magazine 5 has on one face a notch 85 engaged by extremity 86 of a spring pressed catch 87 which has finger engaging portion 88 located adjacent the handle 32 of the operating member and engageable by the same hand which operates such handle when the operating member is in its standard position against stop 33.

The operation of the above described embodiment of my invention is as follows: it will be assumed that the shutter has been released and run down, that there are septa loaded with plates in magazine 5, the lowermost septum resting upon ledges 20, that the slide 22 is in its retracted position, as shown in Fig. 11, that the lug 42 on gear 40 is moved downwardly from the position shown in Fig. 8, the portion of curtain 37 containing the slit 38 being wound over to shaft 35, Fig. 2, that pin 53 is in contact with shoulder 59 upon the slide 55 of the release mechanism and that crank 31 is in its standard position against stop 33 with its outer end and handle 32 projecting beyond the plane of the side face of the camera, in which position the handle is adjacent the finger engaging portion 63 of the release 60.

The photographer grasps the handle 32 and draws it away from stop 33, thereby rotating shaft 28 which, through segment 27 and pinion 26, moves the rack 25 and plate 22 from the position shown in Fig. 11 to the position shown in Fig. 12, thereby carrying the bottom plate septum along the ledges 20 and over the opening 21 through which it drops into magazine 6. The remainder of the plates and septa in magazine 5 rest upon the upper face of the opaque portion 24 of slide 22 and are covered thereby.

During the movement of the slide 22 to the right in Figs. 11 and 12, the shaft 47 is rotated and, through the intermediate gears on panel 41, rotates gear 44 clockwise in Fig. 8. As soon as opaque portion 24 of slide 22 covers the exposure station and it is safe to set the shutter, the lug 43 on gear 44 engages lug 42 upon gear 40 and turns the latter clockwise to the position shown in Fig. 8, such movement of gear 40 rotating shaft 36 to wind curtain 37 thereupon until the slit is in set position, at which time the pin 53 upon gear 51 will ride upon incline 89 of slide 55 and snap into slot 54, thereby holding the shutter in set position. The S upon gear 40 will appear through opening 73 and a corresponding letter on plate 75 will appear through opening 74. Furthermore pawl 81 will drive the ratchet wheel 82 to exhibit a fresh serial numeral through opening 83.

The crank 31, having been moved through the first half of its oscillation, is returned through the rest of its cycle back to the standard position in contact with stop 33. During such return the slide 22 is brought back to the position shown in Fig. 11 and the lowermost septum drops into position 23 on to ledges 20. The rearward movement of slide 22, through the intermediate gearing, rotates gear 44 counter clockwise in Fig. 8 withdrawing lug 43 from in contact with lug 42 but, due to the fact that pin 53 is in slot 54 (Fig. 7), the pinion 50, shaft 36, pinion 39 and gear 40 are held stationary with the shutter set ready for release. Of course, the tension of the spring which rotates shaft 35 may be adjusted by manipulation of head 64 and projections 71, as desired.

The above movement of the operating member or crank 31 through its cycle of operation and back to its standard position thus places the camera in condition for the next exposure, which is now made without removing the operator's hand from handle 32. The photographer's fingers grip the curved portion 63 of the release and by a contraction of the hand, as indicated in Fig. 6, pull the release 60 rearwardly, thereby releasing the pin 53 from the slot 54 and allowing the slit 38 to pass in front of the plate and make the exposure, as will be obvious. When the operator contracts his hand to apply force to portion 63 of the release, the re-action against handle 32 tends to draw the latter or retain it in engagement with stop 33. Furthermore the spring 30 which always urges the crank 31 against its stop likewise insures the proper positions of the parts when the exposure is made. If the operator at any time wishes to remove the magazine 5, he can do so by moving his thumb or finger against the portion 88 of catch 87 without removing his hand from handle 32, as is evident from an inspection of Fig. 6.

It will thus be seen that so long as the operator uses one hand and retains it in contact with handle 32, the parts must necessarily be operated in the proper sequence and this correct operation is insured without the necessity of the operator looking at the camera at all.

Having thus described my invention, what I claim as new and desire to secure by Letters Patent is:

1. A camera comprising a changing device for light-sensitive material, a shutter, a manually operable member movable through a definite cycle to a standard position to operate said changing device and set said shutter, and a shutter release adjacent the standard position of the member whereby both said member and said release may be operated by one hand and be simultaneously engaged by one hand when said member is in its standard position.

2. A camera comprising a changing device for light-sensitive material, a shutter, a manually operable member movable on one face of the camera through a definite cycle to a standard position to operate said changing device and set said shutter, and a shutter release located on a different face of the camera but adjacent the standard position of said member, whereby both said member and said release may be operated by one hand and simultaneously engaged by one hand when said member is in its standard position.

3. A camera comprising a changing device for light-sensitive material, a shutter, a manually operable member for operating said changing device and setting said shutter by movement through a definite cycle into a standard position, and a shutter release adjacent said standard position and having a releasing movement substantially opposite in direction to the movement of said member when the latter moves into its standard position, whereby said member and release may be simultaneously engaged and operating force applied to the release by one hand, the resulting re-active force on the member tending to maintain the latter in its standard position.

4. A camera comprising a changing device for light-sensitive material, a shutter, a stop, a manually operable member movable through a definite cycle and against said stop to operate said changing device and set said shutter, means for resiliently pressing said member toward said stop, and a shutter release adjacent the member when said member engages said stop, whereby both said member and said release may be simultaneously engaged by one hand.

5. A camera comprising a changing device for light-sensitive material, a shutter, an oscillating crank operating through connections including a sector and a rack to actuate said device and set said shutter, and a release for said shutter, the axes of said crank and sector being substantially perpendicular to the focal plane of the camera.

6. A camera comprising a changing device for light-sensitive material, a shutter, a crank having a handle and manually movable from and to a standard position to operate said device and set said shutter, and a release for said shutter located adjacent said handle when the crank is in standard position, whereby said handle and release may be simultaneously engaged by one hand.

7. A camera comprising a changing device for light-sensitive material, a shutter, a crank for operating said device and setting said shutter manually movable on one face of the camera from and to a standard position, in which position it projects beyond the plane of a second face of the camera, and a shutter release on said second face adjacent the projecting end of said crank when the latter is in said standard position.

8. A camera comprising an exposure station, a detachable magazine for light-sensitive material, means for successively presenting different areas of said material to said exposure station and removing them therefrom, a shutter, a manually operable member movable through a definite cycle to a standard position to operate said means and set said shutter, a shutter release and a magazine retaining catch, said release and catch being adjacent the standard position of said member whereby said release and catch may be manipulated by one hand of the operator while said hand is retained in engagement with said member.

9. A camera comprising an exposure station, a shutter, mechanism for setting said shutter, means for shifting successive areas of light-sensitive material into and out of said station, an element movable to cover said station during the setting of the shutter, a device for resiliently pressing said element in a direction to uncover said station, and a release for said shutter.

10. A camera comprising an exposure station, a shutter, mechanism for setting said shutter, means for shifting successive areas of light-sensitive material into and out of said station, said means including an element which participates in said shifting and also covers said station during the setting of the shutter, a device for resiliently pressing said element in a direction to uncover said station, and a release for said shutter.

11. A camera comprising a holder for light-sensitive material, a shutter, a manually operable member movable on one face of the camera through a definite cycle to a standard position in which it is located adjacent the plane of a second camera face, connections between said member and shutter for setting the latter, and a release for the shutter on said second camera face adjacent said member when in its standard position, whereby said member and release may be operated by one hand and simultaneously engaged by that hand when said member is in said standard position.

12. A camera comprising a changing device for light-sensitive material, a shutter, an oscillating crank movable over the top face of the camera forwardly into contact with a stop abutment, a shaft connected to said crank and passing through a substantially dust-tight bearing to the interior of the camera, a spring on the shaft for pressing said crank forwardly toward said abutment, the end of the crank projecting over the side of the camera when the crank engages said abutment, driving connections between said shaft, said changing device, and said shutter, and a release for the shutter movable rearwardly on said side face of the camera substantially toward and adjacent said projecting end of the crank.

Signed at Rochester, New York, this 21st day of February 1919.

WILLIAM F. FOLMER.